(12) United States Patent
Huang et al.

(10) Patent No.: US 7,586,558 B2
(45) Date of Patent: Sep. 8, 2009

(54) DIRECT TYPE BACKLIGHT UNIT HAVING LIFTABLE FRAME STRUCTURE

(75) Inventors: Hsin Fu Huang, Koahsiung (TW); Chin Jing Chen, Koahsiung (TW)

(73) Assignee: Hannstar Display Corp., Taipei (TW)

( * ) Notice: Subject to any disclaimer, the term of this patent is extended or adjusted under 35 U.S.C. 154(b) by 711 days.

(21) Appl. No.: 10/975,668

(22) Filed: Oct. 29, 2004

(65) Prior Publication Data

US 2005/0088839 A1 Apr. 28, 2005

(30) Foreign Application Priority Data

| Nov. 3, 2003 | (TW) | ................ 92130637 A |
| Jan. 9, 2004 | (TW) | ................ 93100504 A |
| Jan. 9, 2004 | (TW) | ................ 93100505 A |

(51) Int. Cl.
  G02F 1/1333 (2006.01)
  G02F 1/1335 (2006.01)
(52) U.S. Cl. .......................... 349/61; 349/58
(58) Field of Classification Search .......... 349/58, 349/61
See application file for complete search history.

(56) References Cited

U.S. PATENT DOCUMENTS

| 5,432,626 A | 7/1995 | Sasuga et al. |
| 7,207,710 B2* | 4/2007 | Kim .................. 362/634 |
| 7,259,810 B2* | 8/2007 | Kim .................. 349/67 |
| 7,327,416 B2* | 2/2008 | Lee et al. ........... 349/65 |
| 2003/0030762 A1* | 2/2003 | Liu et al. ........... 349/61 |

* cited by examiner

Primary Examiner—David Nelms
Assistant Examiner—David Y Chung (57) ABSTRACT

A direct type backlight unit having liftable frame structure includes a housing, an upper frame and a plurality of lamps, wherein the plurality of lamps disposed on a cavity defined by the housing and at least one has a foggy region. The upper frame is configured to accommodate a plurality of optical films and a liquid crystal panel and has two clip members for engaging with two connection hole of the housing such that the upper frame can be easily fixed on the housing. A plurality of lamp connection units are disposed within the cavity and each includes a conductive clamp member for clamping the conductive electrode of the lamp, thereby facilitating the replacement of the lamps.

12 Claims, 12 Drawing Sheets

DIRECT TYPE BACKLIGHT UNIT HAVING LIFTABLE FRAME STRUCTURE

This application claims the priority benefit of Taiwan Patent Application Serial Number 092130637 filed Nov. 3, 2003, Taiwan Patent Application Serial Number 093100504 filed Jan. 9, 2004 and Taiwan Patent Application Serial Number 093100505 filed Jan. 9, 2004, the full disclosures of which are incorporated herein by reference.

BACKGROUND OF THE INVENTION

1. Field of the Invention

This invention generally relates to a direct type backlight unit, and more particularly to a direct type backlight unit having a liftable frame structure.

2. Description of the Related Art

In general, a liquid crystal display typically has a backlight unit for providing light needed by its liquid crystal panel. However, the liquid crystal display may use different kinds of backlight units depending on its use and size. The backlight units mainly include two types, i.e. an edge type and a direct type.

Due to the advantages of high luminance, high light efficiency and simple structure, the direct type backlight unit is widely used in large-size liquid crystal display devices.

Figure 1:
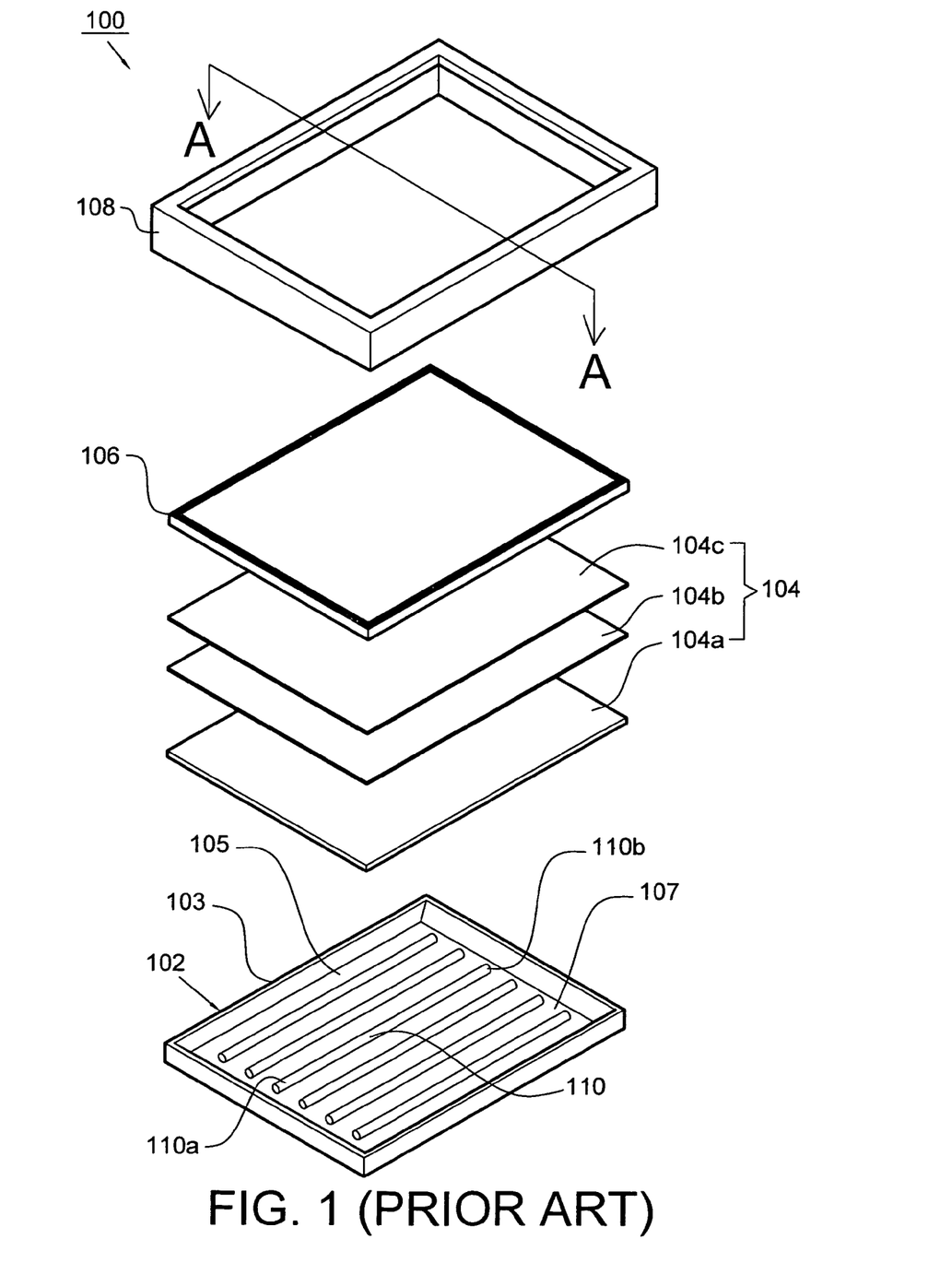
FIG. 1 is an exploded view of a conventional liquid crystal display.
Figure 2:
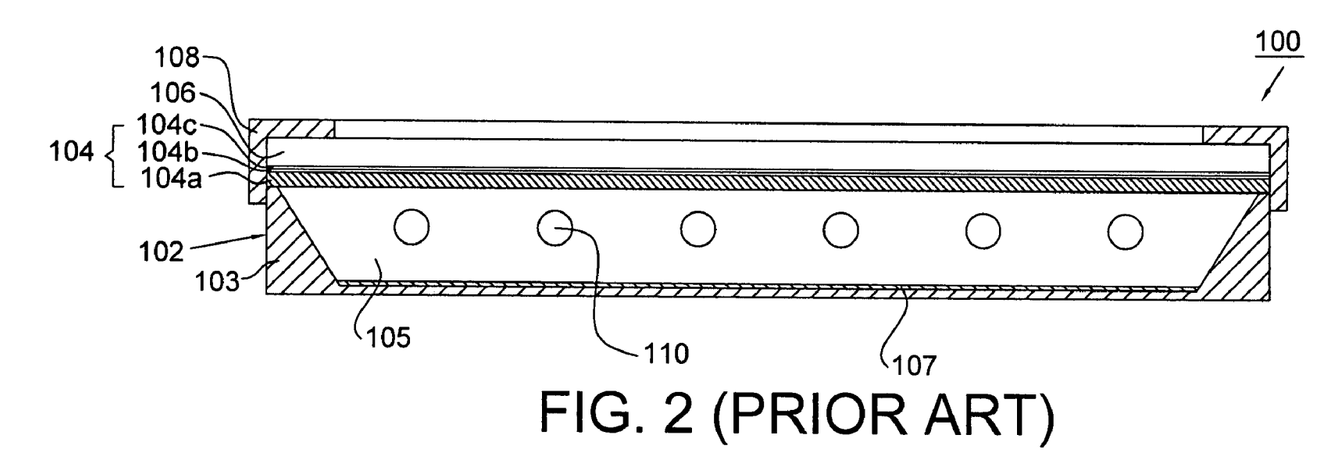
FIG. 2 is a cross-sectional view of the assembled liquid crystal display taken along line A-A in FIG. 1.

FIG. 1 shows an exploded view of a conventional liquid crystal display device 100. The liquid crystal display device 100 comprises a backlight unit 102, a set of optical films 104, a liquid crystal panel 106 and an outer frame 108. The backlight unit 102 is disposed under the liquid crystal panel 106 for distributing the light from a light source uniformly over the surface of the liquid crystal panel 106. The backlight unit 102 comprises a housing 103, a reflector 107 disposed upon the base surface of the housing 103, and lamps 110, such as cold cathode fluorescent lamps (CCFL), disposed within the housing 103. The set of optical films 104 is disposed between the backlight unit 102 and the liquid crystal panel 106, and includes a diffuser 104a disposed upon the backlight unit 102 and a plurality of optical sheets, such as a prism sheet 140b and a diffusing sheet 140c, disposed on the diffuser 104a. The outer frame 108 is disposed upon the liquid crystal panel 106 and the set of optical films 104 and connected to the backlight unit 102 so as to fix the liquid crystal panel 106 and the set of optical films 104 on the backlight unit 102, the outer frame 108 is fixed to the housing 103 by the screws. FIG. 2 shows a cross-sectional view of the assembled liquid crystal display 100 taken along line A-A in FIG. 1.

The lamps 110 are separately disposed within the cavity 105 formed by the housing 103 and positioned under the display area of the liquid crystal panel 106 so as to distribute the light uniformly over the surface of the liquid crystal panel 106. Each lamp 110 has two terminals 110a and 110b, and each terminal has a conductive end extending from the internal electrode of the lamp 110 and is connected to a conductive line 112 by a solder 114 formed by soldering as shown in FIG. 3; wherein the conductive line 112 is electrically connected to a power (not shown) so as to light up each lamp 110.

However, in the structure of the conventional liquid crystal display device 100, when the lamps are required to be repaired or replaced, the outer frame 108 should be first removed and then followed by the removal of the liquid crystal panel 106, the plurality of optical sheets 104c, 104d and the diffuser 104a from the backlight unit 102. Therefore, these removal steps might cause a difficulty in disassembling or assembling work.

In prior art, a backlight unit having a middle frame structure is provided for solving the above problem, which can be found, for example, in U.S. Pat. No. 5,432,626 issued to Sasuga et al. on Jul. 11, 1995, which is incorporated herein by reference. It discloses a liquid crystal display device having an outer frame, a middle frame and a lower frame wherein the middle frame is used for supporting a diffuser and a liquid crystal panel and fixed on the lower frame by a plurality of screws. Also, the outer frame has a plurality of fasteners for respectively connecting the middle frame and the lower frame. However, the connection structure of the liquid crystal display device disclosed by Sasuga et al. is accomplished by the plurality of screws and fasteners, which is also inconvenient for disassembling or assembling work.

Figure 3:
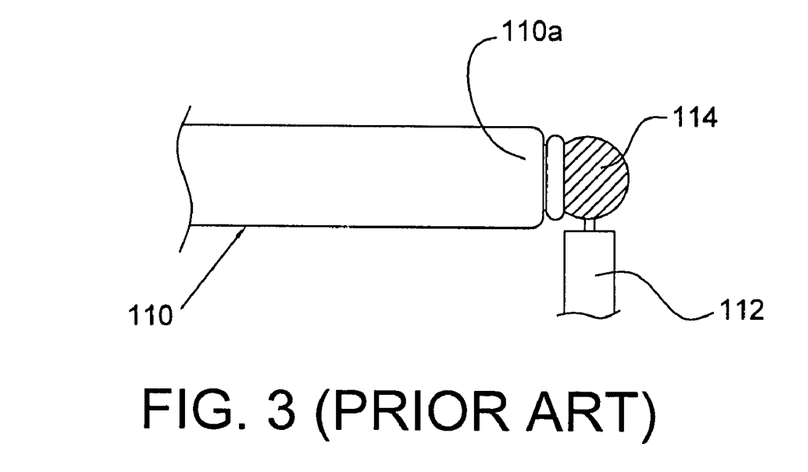
FIG. 3 is an enlarged view of an electrical connection between a conventional lamp and a conductive line.

Further, in prior art (including Sasuga et al. patent), the lamps 110 are electrically connected to a power by soldering as shown in FIG. 3. Therefore, the solder 114 is required to be removed before the lamp 110 will be taken out for repair or replacement work. Furthermore, the soldering manner has tedious processing steps and lower reliability. Also, if a defective solder is formed by a bad soldering process, the solder connecting the conductive end and the conductive line may be melted by a high temperature generated while the lamps are lit up and therefore results in short circuit. In addition, if a solder connecting the conductive end and the conductive line is not well isolated, it may generate point discharge and thus causes scorch or leakage problems.

Additionally, in prior art, the backlight unit needs to be reduced in thickness in order to make a thinner liquid crystal display device. However, if the distance between the liquid crystal panel and the lamps is too close, there will exist uneven luminance problem, i.e., bright lines and dark lines presented on the liquid crystal panel. Also, if the distance between the liquid crystal panel and the lamps is increased, the whole thickness of the liquid crystal display device will become larger. Further, if the distance between the liquid crystal panel and the lamps is too far, the luminance of the liquid crystal panel might be decreased to result in inefficient light utilization. Accordingly, the present invention provides a direct type backlight unit having a liftable frame structure so as to facilitate the assembling and disassembling works while replacing or repairing the lamps. Further, the present invention can reduce the backlight unit in thickness and avoid the uneven luminance problem at the same time.

SUMMARY OF THE INVENTION

It is an object of the present invention to provide a direct type backlight unit having a liftable frame structure so as to facilitate the assembling and disassembling works while replacing or repairing the lamps.

It is another object of the present invention to provide a LCD backlight unit, which has a plurality of lamps wherein at least one lamp has a foggy surface so as to reduce the backlight unit in thickness and avoid the uneven luminance problem presented on the liquid crystal panel.

In order to achieve the above objects, the present invention provides a direct type backlight unit having a liftable frame structure. The present direct type backlight unit comprises a housing, a reflector, a upper frame and a plurality of lamps. The reflector is disposed on the base surface of the housing. The plurality of lamps are disposed within a cavity defined by the housing and at least one lamp has a foggy region. The upper frame is configured to accommodate a plurality of optical films and a liquid crystal panel and has two clip members for engaging with two connection hole of the housing. Further, the upper frame is provided with a plurality of positioning elements and the housing is provided with a plurality of positioning holes such that the upper frame can be fixedly and accurately positioned on the housing by the connection of the positioning elements and the positioning holes. In addition, the direct type backlight unit having a liftable frame structure comprises a plurality of lamp connection unit wherein each lamp connection unit comprises a conductive clamp member for clamping the conductive electrode of the lamp, thereby facilitating the assembling and disassembling works while replacing or repairing the lamps.

According to the direct type backlight unit of the present invention, the upper frame is fixed on the housing by the clip members and thus can be easily disassembled from the housing without using any tools while the lamps will be repaired or replaced. Also, since the plurality of optical films and the liquid crystal panel are accommodated within the upper frame, they can be removed together with the upper frame while the upper frame is disassembled from the housing. In this manner, the plurality of optical films and the liquid crystal panel will not be separated and polluted so as to facilitate the assembling and disassembling works while replacing or repairing the lamps.

In addition, according to the direct type backlight unit of the present invention, each lamp connection unit has a clamp member which is electrically connected to a power and electrically clamps the conductive electrode of the lamp so as to light up each lamp. In this configuration, the lamp can be electrically connected to a power without using conventional soldering process. Also, the lamp can be easily replaced without using any auxiliary tools.

Further, since the lamp of the backlight unit according to the present invention has the foggy region, the distance between the liquid crystal panel and the lamp can be reduced without causing bright lines and dark lines on the liquid crystal panel, i.e. without causing the uneven luminance problem. Therefore, the backlight unit according to the present invention can be reduced so as to make the liquid crystal display device thinner.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE PREFERRED EMBODIMENT

Figure 4:
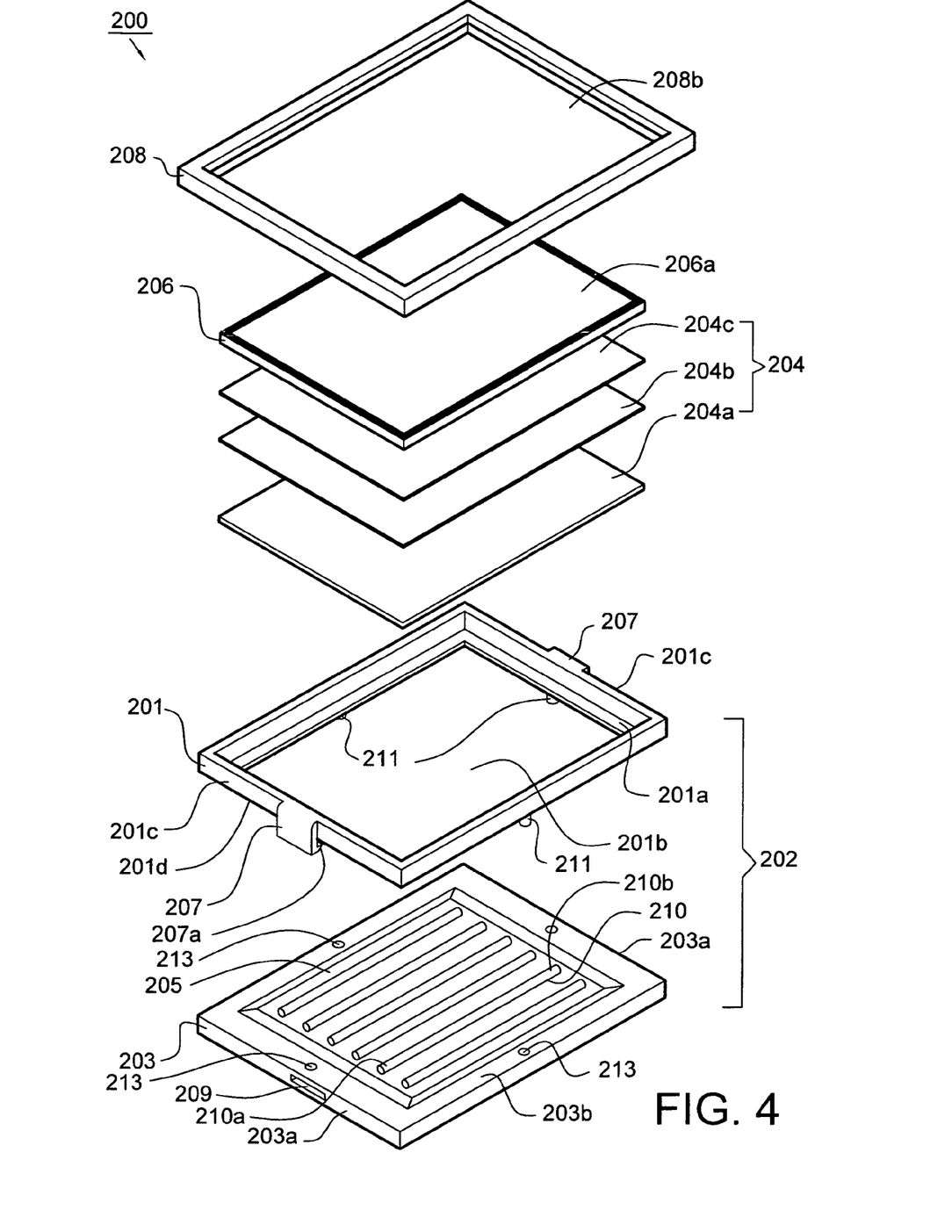
FIG. 4 is an exploded view of a liquid crystal display device according to one embodiment of the present invention.

FIG. 4 is an exploded view of a liquid crystal display device 200 according to one embodiment of the present invention. The liquid crystal display device 200 comprises a direct type backlight unit 202, a set of optical films 204, a liquid crystal panel 206 and an outer frame 208. The liquid crystal panel 206 is used for producing an image and the direct type backlight unit 202 is used for emitting light to the liquid crystal panel 206. The set of optical films 204 is disposed between the backlight unit 202 and the liquid crystal panel 206. The set of optical films 204 includes a diffuser 204a disposed upon the backlight unit 202 and a plurality of optical sheets, such as a diffusing sheet 204b and a prism sheet 204c, disposed on the diffuser 204a. The diffuser 204a is disposed upon the backlight unit 202 and typically made of half-transparent polyethylene terephthalate (PET), polyethylene terephthalate (PC), or polycarbonate for further evenly diffusing the light emitted from the backlight unit 202. Then, the diffused light will pass through the plurality of optical sheet, such as the diffusing sheet 204b and the prism sheet 204c, and finally reach the liquid crystal panel 206. The outer frame 208 is disposed upon the liquid crystal panel 206 and the set of optical films 204 so as to fix the liquid crystal panel 206 and the set of optical films 204 upon the backlight unit 202. Further, the outer frame 208 defines an opening 208b thereof such that a display area 206a of the liquid crystal panel 206 is exposed from the opening 208b of the outer frame 208 after the outer frame 208 combines with the backlight unit 202.

The backlight unit 202 comprises an upper frame 201 and a housing 203, which defines a cavity 205 for accommodating a plurality of lamps 210 such as cold cathode fluorescent lamps (CCFL). The lamps 210 are separately disposed within the cavity 205 so as to provide the light to the liquid crystal panel 206. The upper frame 201 has a recess 201a for accommodating the set of optical films 204 and the liquid crystal panel 206. The bottom of the upper frame 201 further defines an opening 201b above the cavity 205 of the housing 203 for receiving the light provided by the lamps 210. The light provided by the lamps 210 can pass through the opening 201b of the upper frame 201 to reach the set of optical films 204, and then is uniformly distributed over the liquid crystal panel 206 through the set of optical films 204.

The upper frame 201 has two clip members 207 respectively on its two opposite outer side walls, and the housing 203 has two connection hole 209 respectively on its two opposite outer side walls. Preferably, the clip members 207 are formed integrally with the upper frame 201, and the connection holes 209 are formed integrally with the housing 203. The clip members 207 are respectively positioned on the side walls 201c and downwardly extend beyond the under surface 201d of the upper frame 201 wherein their downward ends respectively form an inward hook 207a. While the upper frame 201 is ready to combine with the housing 203, the upper frame 201 is positioned above and aligned with the housing 203 and then downwardly pressed by an applied force such that the inward hooks 207a can respectively contact the side walls 203a of the housing 203 and downwardly move along the side walls 203a until engaging with the connection holes 209. Therefore, the upper frame 201 can be easily fixed upon the housing 203 by the engagement of the clip members 207 and the connection holes 209 as shown in FIG. 5 and FIG. 6.

Preferably, the upper frame 201 has a plurality of positioning elements 211 on the periphery of the under surface 201d, and the housing 203 has a plurality of positioning holes 213 on the periphery surface 203b and respectively corresponding to the positioning elements 211 in position. Therefore, the upper frame 201 can be fixedly and accurately positioned on the housing 203 by the connection of the positioning elements 211 and the positioning holes 213.

Figures 5, 6:
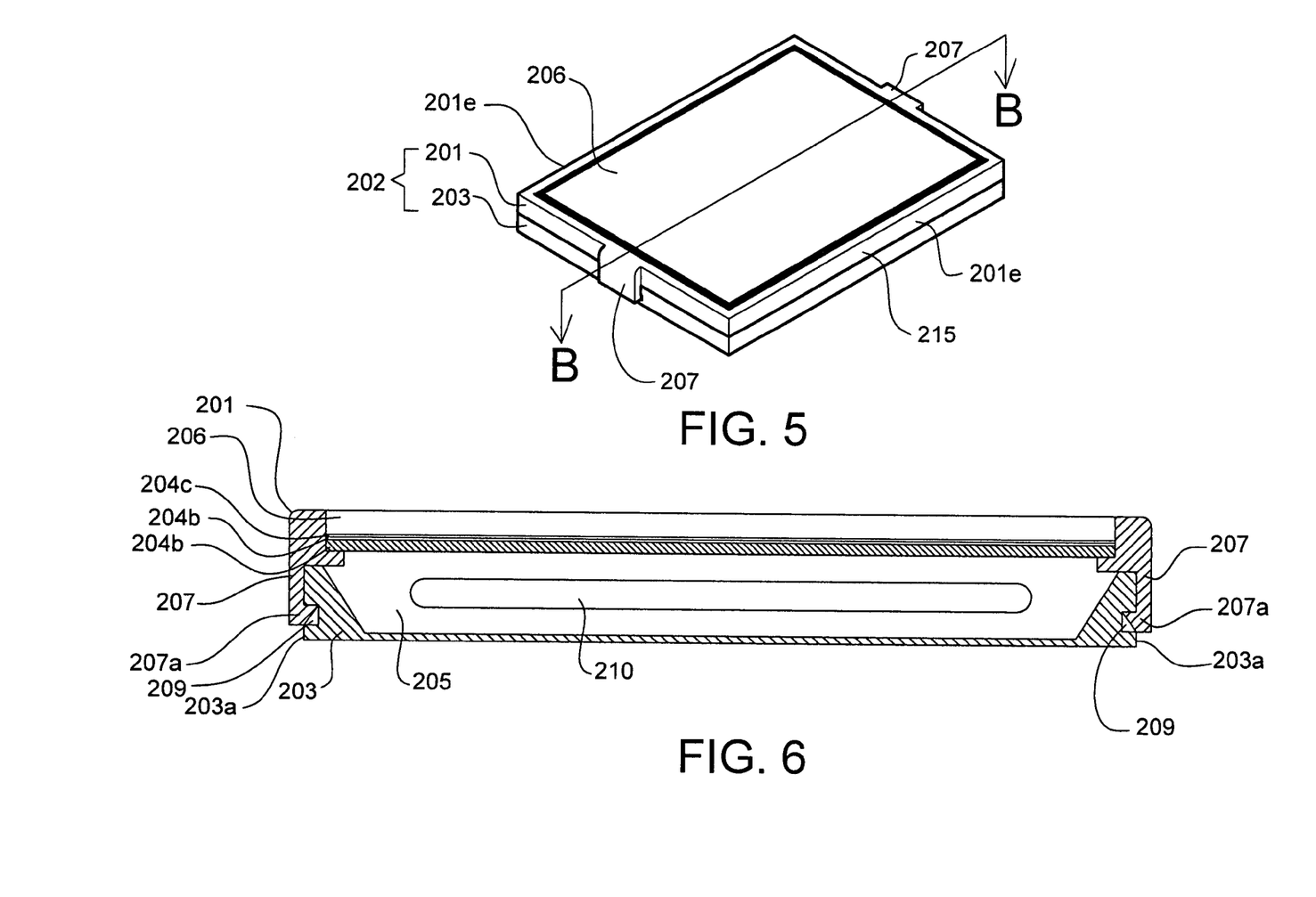
FIG. 5 is a perspective view of the assembled liquid crystal display (not including the outer frame) in FIG. 4.
FIG. 6 is a cross-sectional view of the assembled liquid crystal display taken along line B-B in FIG. 5.

FIG. 5 and FIG. 6 are respectively a perspective view of the assembled structure of the backlight unit 202, the set of optical films 204 and the liquid crystal panel 206 (not including the outer frame 208) in FIG. 4 and a cross-sectional view taken along line B-B in FIG. 5. While the upper frame 201 is to be disassembled from the housing 203, it can be easily separated from the housing 203 by respectively and outwardly pulling the downward ends, i.e. the position forming the inward hooks 207a, of the two clip members 207 and applying a upward force thereto.

According to one embodiment of the present invention, the clip members 207 and/or the plurality of positioning elements 211 are disposed on the housing 203 and the connection holes 209 and/or the plurality of positioning holes 213 are disposed on the upper frame 201 (not shown), which can also achieve the objective of facilitating the connection between the housing 203 and the upper frame 201.

Further, according to the liquid crystal display device 200 of the present invention, the outer frame 208 can be connected to the upper frame 201 of the backlight unit 202 by the above-mentioned connection structure such that the liquid crystal panel 206 and the set of optical films 204 can be secured within the recess 201a by the outer frame 208.

Figure 7:
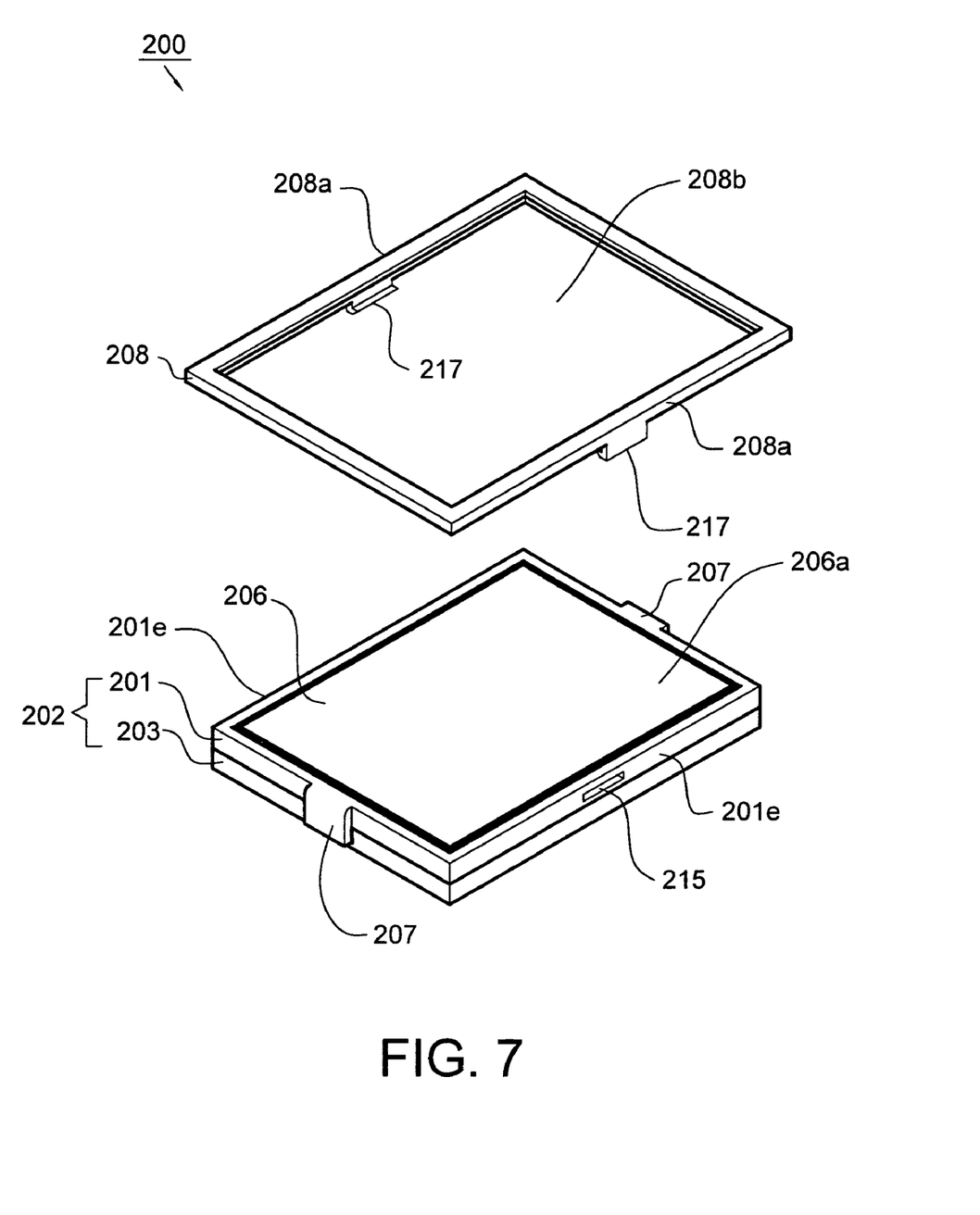
FIG. 7 is a schematic view of the assembled structure of the outer frame and the backlight unit according to one embodiment of the present invention.

FIG. 7 is a schematic view of the assembled structure of the outer frame 208 and the backlight unit 202 according to one embodiment of the present invention. The upper frame 201 has two second connection holes 215 (only one shown) respectively on the two opposite side walls 201e, and the outer frame 208 has two second clip members 217 respectively on its two opposite side walls 208a. Preferably, the second clip members 217 are formed integrally with the outer frame 208, and the second connection holes 215 are formed integrally with the upper frame 201. The outer frame 208 is fixed upon the upper frame 201 by the engagement of the second clip members 217 and the second connection holes 215 such that the disassembling and assembling works for the outer frame 208 and the backlight unit 202 can become more easy.

Figure 8:
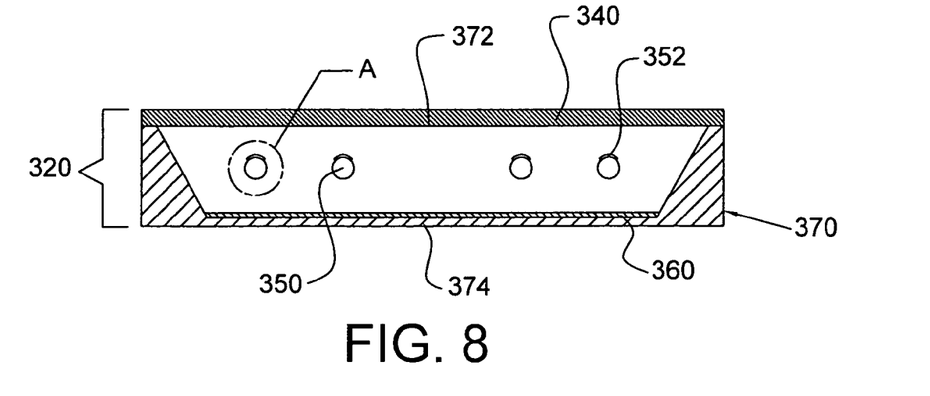
FIG. 8 is a cross-sectional view of a backlight unit according to other embodiment of the present invention.

FIG. 8 is a cross-sectional view of a backlight unit 320 according to other embodiment of the present invention. The backlight unit 320 comprises a housing 370, a reflector 360 disposed on the base surface 374 of the housing 370, a plurality of lamps 350 disposed within the housing 370 and a set of optical films 340, such as a diffuser or a prism sheet, disposed upon the top surface 372 of the housing 370 for providing uniform light to a liquid crystal panel (not shown).

Figure 9A:
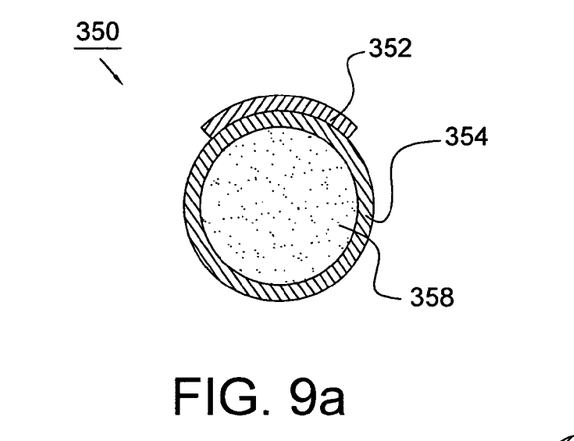
FIG. 9a is an enlarged view of region A of the backlight unit shown in FIG. 8.
Figure 9B:
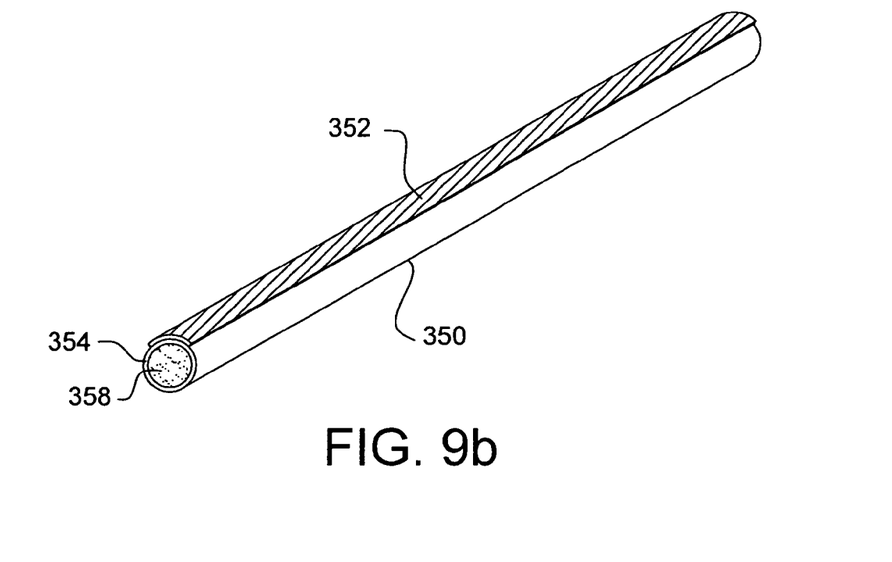
FIG. 9b is a perspective view of region A of the backlight unit shown in FIG. 8.

FIGS. 9a and 9b show the lamp 350 according to the present invention. The lamp 350 is typically a cold cathode fluorescent lamp (CCFL) or hot cathode fluorescent lamp (HCFL) having a thin and long tube-like structure. The lamp 350 has a transparent substance, such as a glass tube 354, and a mercury vapor 358 filled inside. A fluorescent material (not shown) is applied over the inner wall of the glass tube 354. When the lamp 350 is applied with a voltage at its both terminals, the mercury vapor 358 will be excited such that the fluorescent material can create visible light.

The lamp 350 further has a foggy region 352 disposed on the outer surface of the glass tube 354, i.e. on the outer surface facing to the liquid crystal panel as shown in FIG. 8. The light emitted by the lamp 350 will first pass through the foggy region 352 and be scattered by the foggy region 352, and then pass through the set of optical films 340 to illuminate the liquid crystal panel such that the lamp 350 can uniformly illuminate the liquid crystal panel 313 without causing bright lines and dark lines on the liquid crystal panel 313.

The foggy region 352 can be formed by various processes or manners. For example, the foggy region 352 can be formed by attaching a film to the glass tube 354 through a coating process, a sticking process or a printing process. Alternatively, the foggy region 352, for example, can be formed on the glass tube 354 by a notching process or a roughing process such that a partial surface of the glass tube 354 can become foggy and thus form the foggy region 352.

For example, in a specific embodiment, the formation of the foggy region 352 is achieved by a coating process to form a film on the glass tube 354. The material of the film can be polycarbonate (PC) resin or poly-ethylene terephthalate (PET) resin, and a diffusant such as fine glass power or other scattering material with high optical transparency is mixed or blended into the film. It could be understood by the skilled in the art that the surface area and thickness of the foggy region 352 of the lamp 350 will be decided depending on the structure of the backlight unit 320, such as the distance between the lamp 350 and the set of optical films 340 or the thickness of the backlight unit 320, etc.

Since the lamp 350 of the backlight unit 320 according to the present invention has the foggy region 352, the distance between the liquid crystal panel and the lamp 350 can be reduced without causing bright lines and dark lines on the liquid crystal panel, i.e. without causing the uneven luminance problem. Therefore, the backlight unit according to the present invention can be reduced so as to make the liquid crystal display device thinner.

Figure 10:
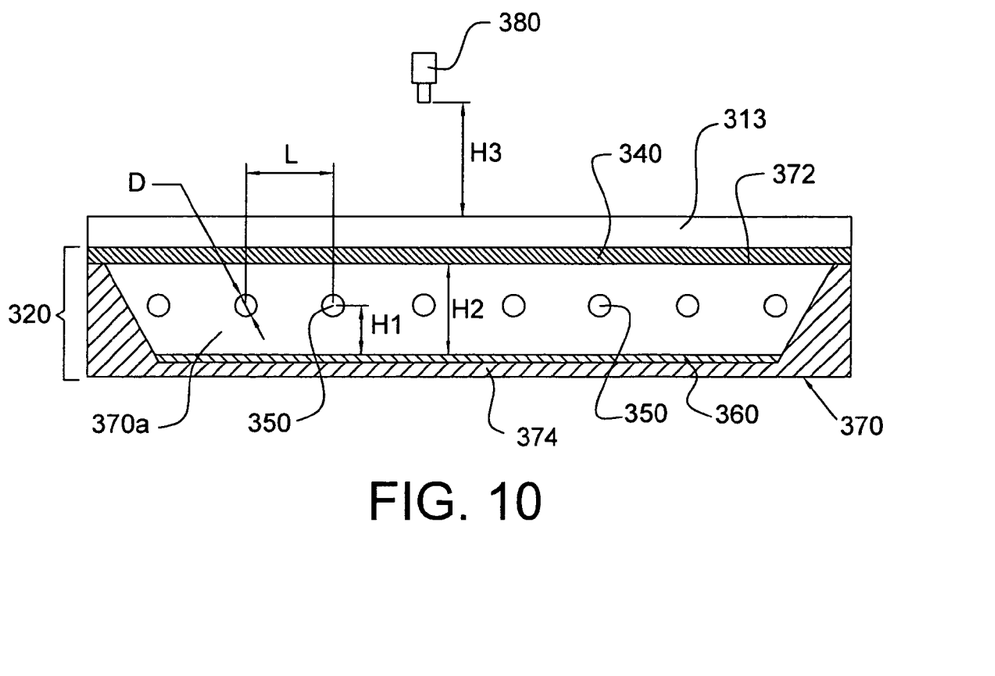
FIG. 10 is a cross-sectional view of a liquid crystal and a backlight unit according to the present invention.

Referring to FIG. 10, it shows a liquid crystal panel 313 and a backlight unit 320 according to one specific embodiment of the present invention. The backlight unit 320 comprises a plurality of lamps 350 (eight in this embodiment) wherein the distance L between two lamps 350 is about 23.5 mm, the diameter D of each lamp 350 is about 3 mm, and the distance H1 between the lamps 350 and the reflector 360 is about 3.5 mm. An optical measuring equipment 380 such as luminance meter (Model: Topcon BM-7) is used to obtain the luminance data of the backlight unit 320, wherein the distance H3 between the optical measuring equipment 380 and the liquid crystal panel 313 is about 50 cm.

Figure 11:
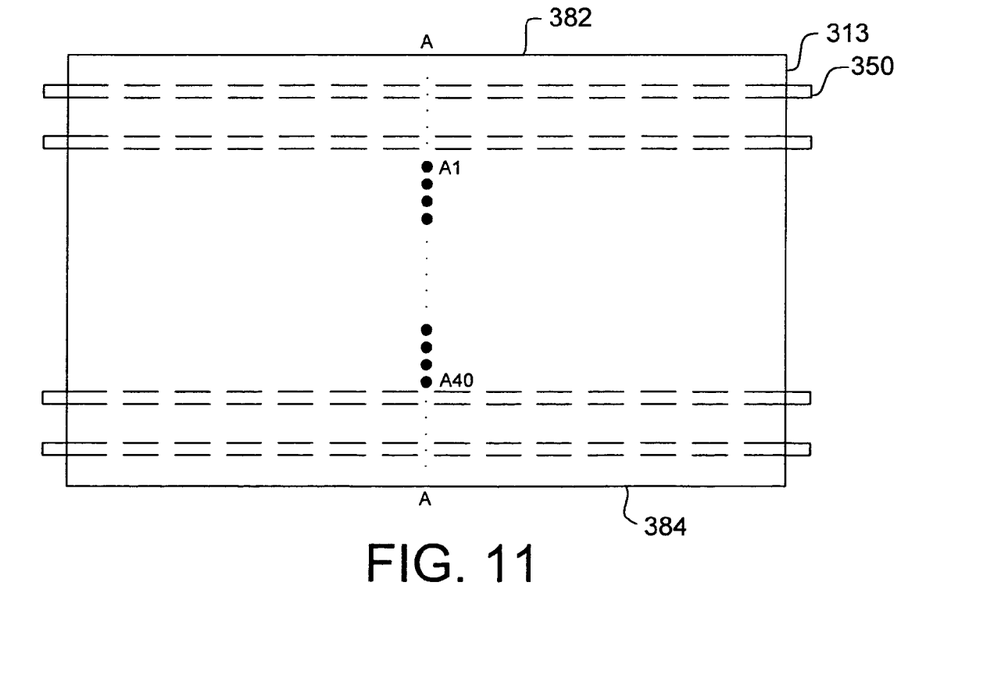
FIG. 11 is a top view of a liquid crystal and a backlight unit according to the present invention.

Referring to FIG. 11, there are forty measurement points (A1, A2, . . . , A39, A40) being selected along a central line, i.e. dotted line A-A, of the liquid crystal panel 313. The distance between the respective measurement points A1, A40 and the respective side edge 382, 384 is about 124 mm, and the distance between two adjacent measurement points is about 1 mm.

In the first experiment, the lamps 350 is not provided with the foggy region, and the distance H2 between the reflector 360 and the set of optical films 340 is about 15 mm, i.e. substantially equal to the thickness of the backlight unit.

The luminance data are measured from the forty measurement points (A1, A2, . . . , A39, A40) on the liquid crystal panel 313, and the results are recorded in Table 1.

TABLE 1

| | A1 | A2 | A3 | A4 | A5 | A6 | A7 | A8 | A9 | A10 | A11 | A12 | A13 | A14 | A15 | A16 | A17 | A18 | A19 | A20 |
|---|---|---|---|---|---|---|---|---|---|---|---|---|---|---|---|---|---|---|---|---|
| H2 (15 mm) | 855.3 | 857.5 | 859.2 | 860.6 | 863 | 836.8 | 864.3 | 864.8 | 864.9 | 864.6 | 865.1 | 864.7 | 864.1 | 864.1 | 863.7 | 864 | 863.3 | 863.8 | 863.7 | 862.8 |
| | A21 | A22 | A23 | A24 | A25 | A26 | A27 | A28 | A29 | A30 | A31 | A32 | A33 | A34 | A35 | A36 | A37 | A38 | A39 | A40 |
| H2 (15 mm) | 862.8 | 862.1 | 862.2 | 861.6 | 861.2 | 860.6 | 859.1 | 858.4 | 857.5 | 856.5 | 855.4 | 854.4 | 853.2 | 852.8 | 850.8 | 849.1 | 846.9 | 845.3 | 842.3 | 840.3 |

Standard Deviation Value: 7.44
Mean: 858.1 cd/m$^2$

In the second experiment, the lamp 350 is not provided with the foggy region, and the distance H2 between the reflector 360 and the set of optical films 340 is about 12 mm, i.e. substantially equal to the thickness of the backlight unit. The luminance data are measured from the forty measurement points (A1, A2, . . . , A39, A40) on the liquid crystal panel 313, and the results are recorded in Table 2.

TABLE 2

| | A1 | A2 | A3 | A4 | A5 | A6 | A7 | A8 | A9 | A10 | A11 | A12 | A13 | A14 | A15 | A16 | A17 | A18 | A19 | A20 |
|---|---|---|---|---|---|---|---|---|---|---|---|---|---|---|---|---|---|---|---|---|
| H2 (12 mm) | 956.3 | 958.7 | 960.4 | 962.9 | 964.2 | 965.4 | 966.3 | 967.3 | 967.8 | 968.2 | 968.3 | 967.2 | 965.8 | 964.7 | 963.1 | 960.5 | 958.3 | 956.7 | 955.5 | 954.1 |
| | A21 | A22 | A23 | A24 | A25 | A26 | A27 | A28 | A29 | A30 | A31 | A32 | A33 | A34 | A35 | A36 | A37 | A38 | A39 | A40 |
| H2 (12 mm) | 953.2 | 953.3 | 952.8 | 953.4 | 952.9 | 953.2 | 953.2 | 952.8 | 952.5 | 952.2 | 951.4 | 949.8 | 948.8 | 947.6 | 946.6 | 946 | 944.8 | 943.5 | 941.6 | 939.9 |

Standard Deviation Value: 8.00
Mean 956.0 cd/m$^2$

In the third experiment, the lamp 350 is provided with a foggy region 352 thereon, and the distance H2 between the reflector 360 and the set of optical films 340 is still about 12 mm, i.e. substantially equal to the thickness of the backlight unit. The foggy region 352 is formed by attaching a diffusing sheet to the surface of the lamp 350. In this experiment, the diffusing sheet is the product D121Z commercially obtained from Tsujiden Co., Ltd. The diffusing sheet is about 2 mm in width, and its material is poly-ethylene terephthalate (PET). The luminance data are measured from the forty measurement points (A1, A2, . . . , A39, A40) on the liquid crystal panel 313, and the results are recorded in Table 3.

TABLE 3

|  | A1 | A2 | A3 | A4 | A5 | A6 | A7 | A8 | A9 | A10 | A11 | A12 | A13 | A14 | A15 | A16 | A17 | A18 | A19 | A20 |
|---|---|---|---|---|---|---|---|---|---|---|---|---|---|---|---|---|---|---|---|---|
| H2 (12 mm) | 943.1 | 945.5 | 948.2 | 950.3 | 951.8 | 952.7 | 954.4 | 955.8 | 956.3 | 957 | 957.1 | 956.8 | 955.8 | 955.6 | 953.9 | 953.3 | 952.7 | 950.4 | 948.9 | 948.1 |
|  | A21 | A22 | A23 | A24 | A25 | A26 | A27 | A28 | A29 | A30 | A31 | A32 | A33 | A34 | A35 | A36 | A37 | A38 | A39 | A40 |
| H2 (12 mm) | 947.2 | 946.7 | 946.6 | 946.8 | 947.2 | 947.3 | 947.2 | 946.4 | 946.3 | 946 | 945.5 | 944.5 | 944.1 | 942.8 | 941.4 | 940 | 938.9 | 937.7 | 935.9 | 933.4 |

Standard Deviation Value: 6.05
Mean 948.0 cd/m$^2$

Figure 12:
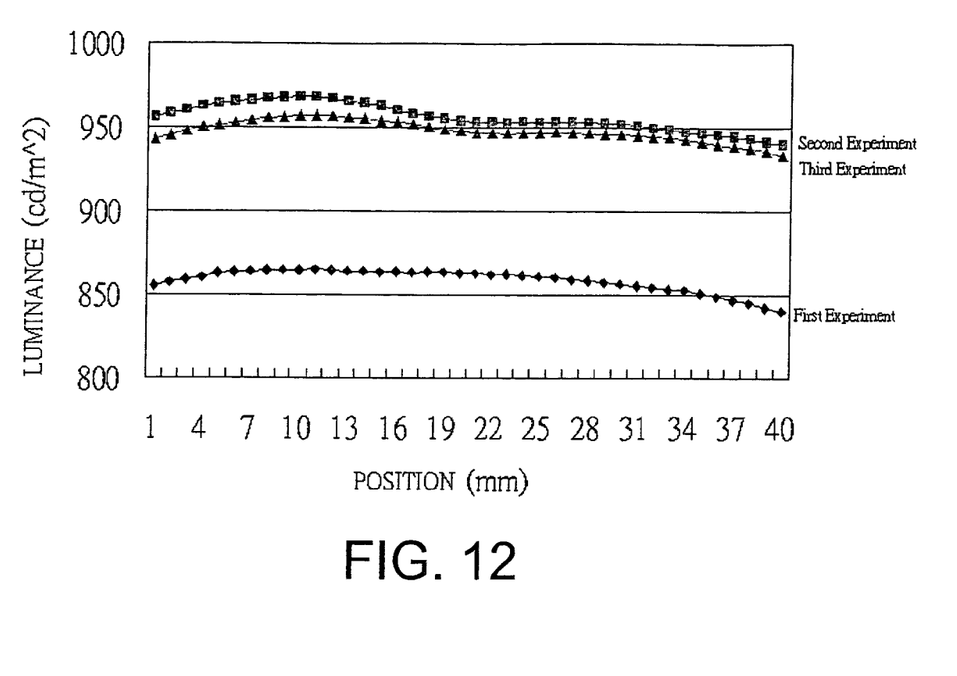
FIG. 12 is a graph for showing the luminance data obtained in first, second and third experiments.

FIG. 12 is a graph for showing the luminance data in Table 1, Table 2 and Table 3. As shown in FIG. 12, the liquid crystal panel of the third experiment, in which the lamp 350 has the foggy region 352, has higher luminance than that of the first experiment. Also, the difference between the highest luminance value and the lowest luminance value in the third experiment is smaller than that in the second experiment; therefore, the luminance range in the third experiment is smaller than that in the second experiment.

Further, the second experiment and the third experiment can be further discussed through the concept of standard deviation so as to better understand the luminance uniformity. The standard deviation is used to show the variability between the data and the mean. That is, the variability is large if the standard deviation is large, and the variability is small if the standard deviation is small.

The standard deviations of the data in the second and third experiment are respectively 8.00 and 6.05. Therefore, the variability between the data and the mean in the third experiment is smaller than that in the second experiment. That is, the luminance of the liquid crystal panel in the third experiment is more uniform than that in the second experiment. Further, after comparison between the standard deviation value 6.05 of the third experiment and the standard deviation value 7.44 of the first experiment, it could be found that the luminance of the liquid crystal panel in the third experiment is more uniform than that in the first experiment.

In the first, second and third experiments, the manner of using the optical measuring equipment to observe the luminance of the liquid crystal panel can be alternatively replaced by the manner of using a camera to take the pictures of the liquid crystal panel 313 and indirectly observing the luminance changes through the pictures, or the manner of directly observing the luminance changes on the liquid crystal panel. For example, the picture of the liquid crystal panel 313 taken in the first experiment does not present bright lines and dark lines. The picture of the liquid crystal panel 313 taken in the second experiment presents bright lines and dark lines, which are alternatively presented one by one on the crystal panel 313 and corresponding to the number of the lamps. The picture of the liquid crystal panel 313 taken in the third experiment does not present bright lines and dark lines.

As described above, the present invention can reduce the backlight unit in thickness and avoid the uneven luminance problem at the same time.

Figure 13:
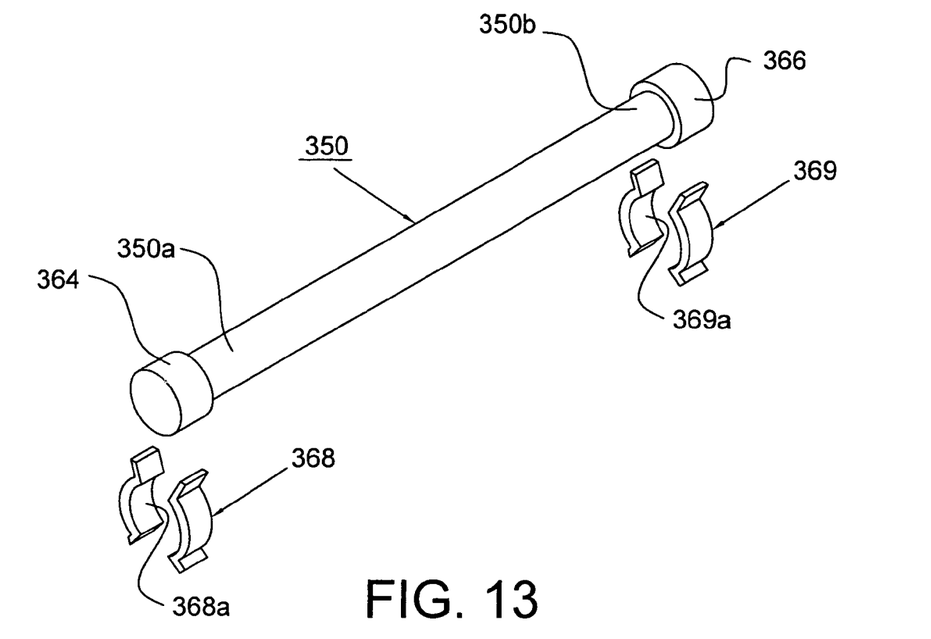
FIG. 13 is a schematic view of the configuration of a lamp according to one embodiment of the present invention.

FIG. 13 is a schematic view of the configuration of the lamp 350 according to one embodiment of the present invention. Each lamp 350 has two terminals 350a and 350b, and each terminal has an external conductive electrode 364 and 366 disposed thereon for electrically connecting with a power (not shown) so as to light up the lamps 350. FIG. 13 further shows two lamp connection units 368 and 369, which are disposed within a cavity 370a defined by the housing 370 as shown in FIG. 10. The lamp connection units 368 and 369 respectively have a conductive clamp member 368a and 369a electrically connected to a power (not shown). The conductive clamp members 368a and 369a respectively clamp the external conductive electrode 364 and 366 of each lamp 350 so as to fix the lamps 350 upon the base surface 374 of the housing 370. In addition, the conductive clamp members 368a, 369a clamping the two terminals are respectively connected to the positive electrode and the negative electrode of the power so as to light up each lamp 350. According to the lamp configuration of the present invention, a lamp can be easily replaced and repaired without proceeding with tedious soldering process.

It should be noted that the feature of the lamp connection units 368 and 369 can be made in different shape in accordance with different requirements so as to fit the different shape of external conductive electrodes 364 and 366.

Figure 14:
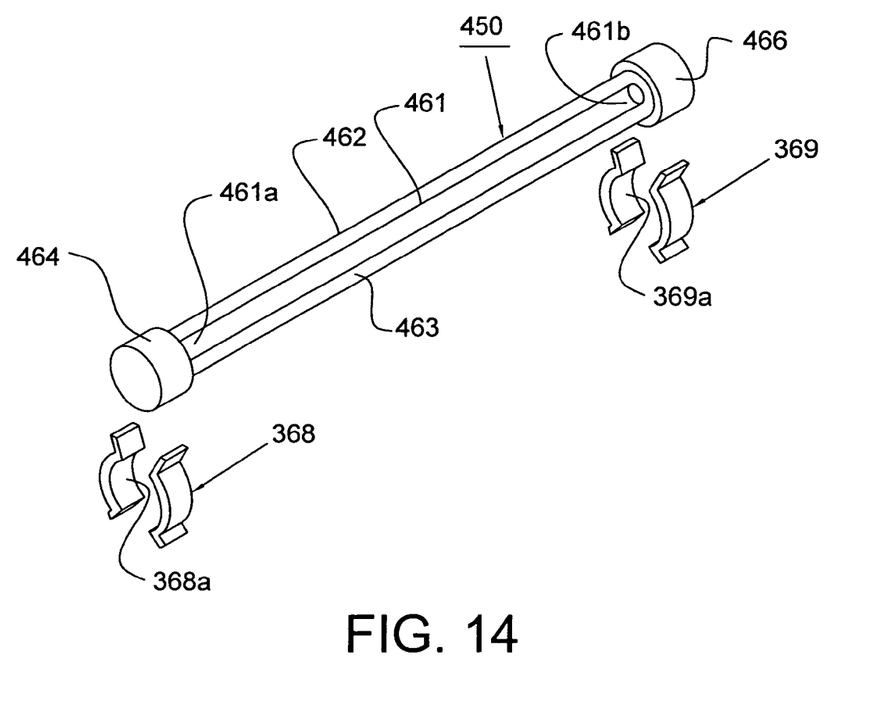
FIG. 14 is a schematic view of the configuration of a lamp according to another embodiment of the present invention.
Figure 15A:
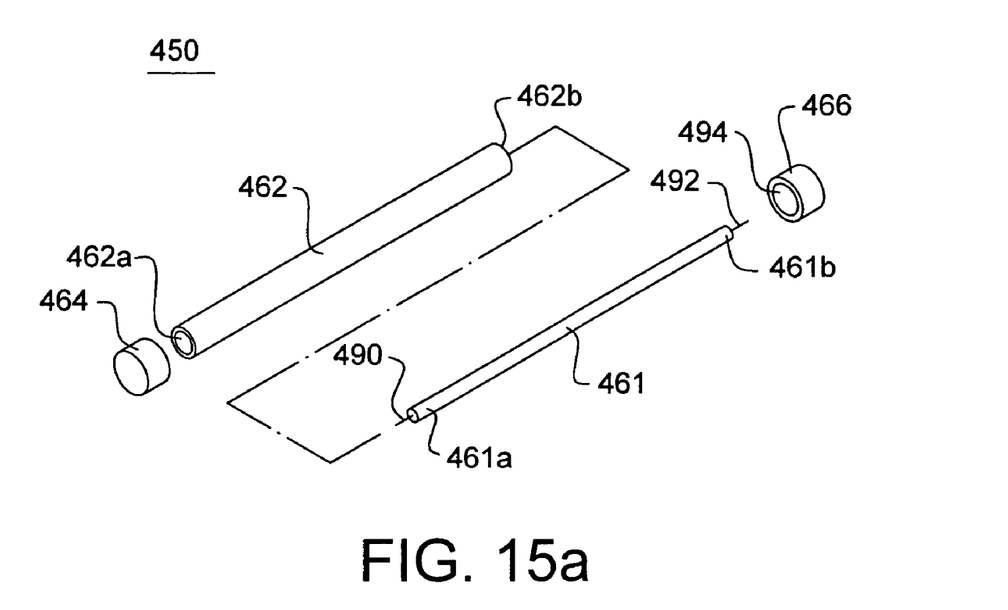
FIGS. 15a and 15b illustrate two different manners for fixing the inner light source within the light-permeable tube.
Figure 15B:
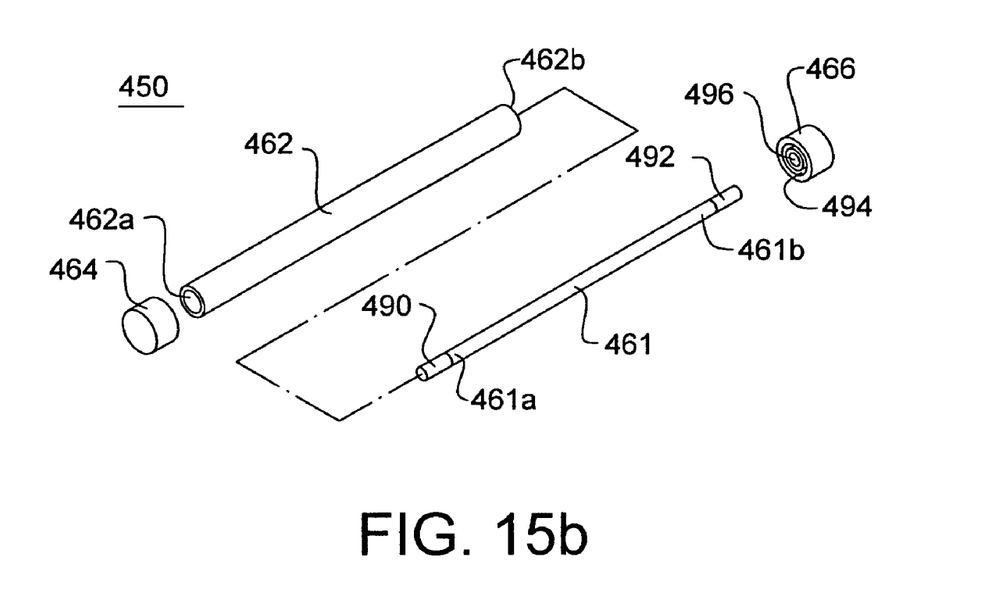

FIG. 14 is a schematic view of the configuration of a lamp 450 according to another embodiment of the present invention. The lamp 450 includes an inner light source 461 and a light-permeable tube 462. Preferably, the inner light source 461 is a cold cathode fluorescent lamp (CCFL) or hot cathode fluorescent lamp (HCFL). The inner light source 461 is fixedly disposed within a cavity 463, which is defined by the light-permeable tube 462, through two external conductive electrodes 464 and 466. The external conductive electrodes 464 and 466 are respectively disposed at two openings (not shown) of the light-permeable tube 462 for fixing two terminals 461a and 461b of the inner light source 461. Further, the two terminals 461a and 461b of the inner light source 461 respectively have an inner conductive electrode (not shown) electrically connected to the respective external conductive electrode 461a, 461b. FIGS. 15a and 15b illustrate two different manners for fixing the inner light source 461 within the light-permeable tube 462. In addition, two lamp connection units 468 and 469 and their conductive clamp members 468a and 469a units shown in FIG. 14 are substantially the same with those shown in FIG. 13.

Referring to FIG. 15a and FIG. 15b, the external conductive electrodes 464 and 466 are designed as caps and respectively define a connection hole 494 for respectively connecting with two openings 462a, 462b of the light-permeable tube 462. As shown in FIG. 15a, the inner conductive electrodes 490 and 492 at the two terminals 461a and 461b of the inner light source 461 are lead types and can be electrically and fixedly connected to the external conductive electrodes 464 and 466 by soldering manner. In FIG. 15b, the inner conductive electrodes 490 and 492 at the two terminals 461a and 461b of the inner light source 461 are preferably metal tape types, which are respectively wrapped around the two terminals 461a and 461b of the inner light source 461; the two terminals 461a and 461b can be respectively inserted into a insertion hole 496 formed within the connection hole 494 so as to be electrically connected and fixed to the external conductive electrodes 464 and 466.

Figure 16:
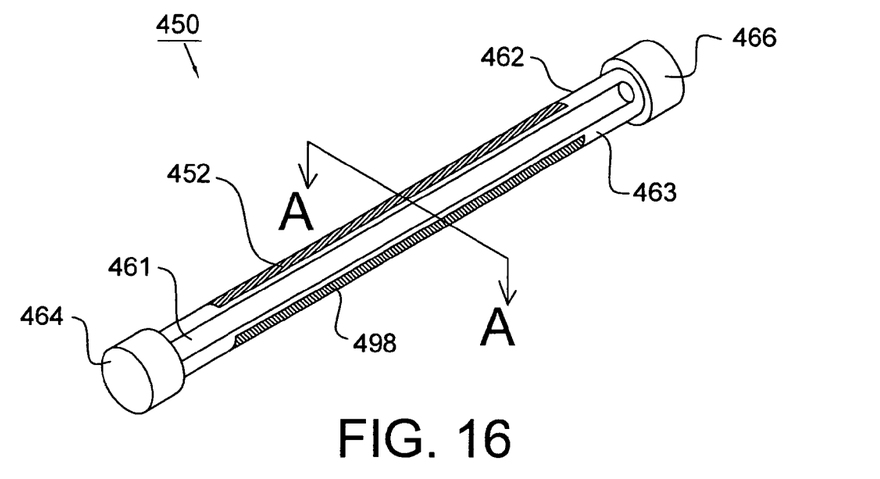
FIG. 16 is a perspective view of a lamp according to another embodiment of the present invention.
Figure 17:
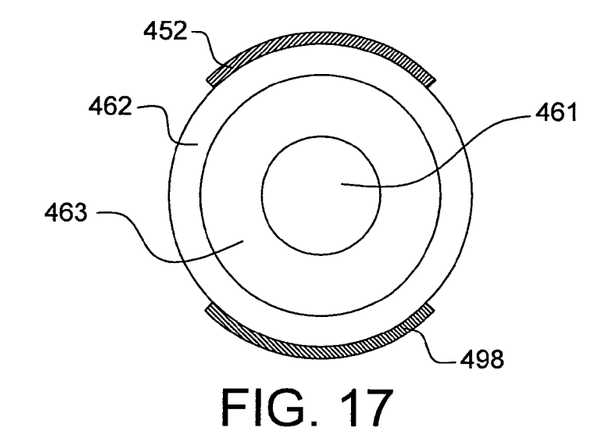
FIG. 17 is a cross-sectional view taken along with line A-A in FIG. 16.

FIG. 16 and FIG. 17 are respectively a perspective view and a cross-sectional view of the lamp 450 taken along with line A-A in FIG. 16 according to another embodiment of the present invention. A foggy region 452 is disposed on the outer surface of the light-permeable tube 462, i.e. on the outer surface facing to a liquid crystal panel (not shown), which can also achieve the objectives of reducing the thickness of the backlight unit and avoiding the uneven luminance problem of the liquid crystal panel. In addition, a reflecting film 498 can be disposed on the opposite outer surface, opposite to the foggy region 452, of the light-permeable tube 462, i.e. on the outer surface opposite to the liquid crystal panel so as to improve the light utilization efficiency of the lamps.

Figure 18:
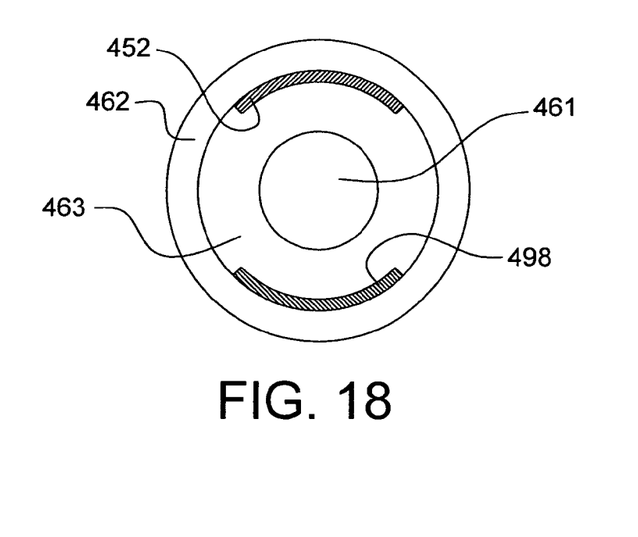
FIG. 18 is a cross-sectional view of a lamp according to another embodiment of the present invention.

FIG. 18 is a cross-sectional view of the lamp according to another embodiment of the present invention. The foggy region 452 is disposed on the inner surface of the light-permeable tube 462. In addition, the reflecting film 498 is disposed on the opposite inner surface, which is opposite to the foggy region 452.

Figure 19:
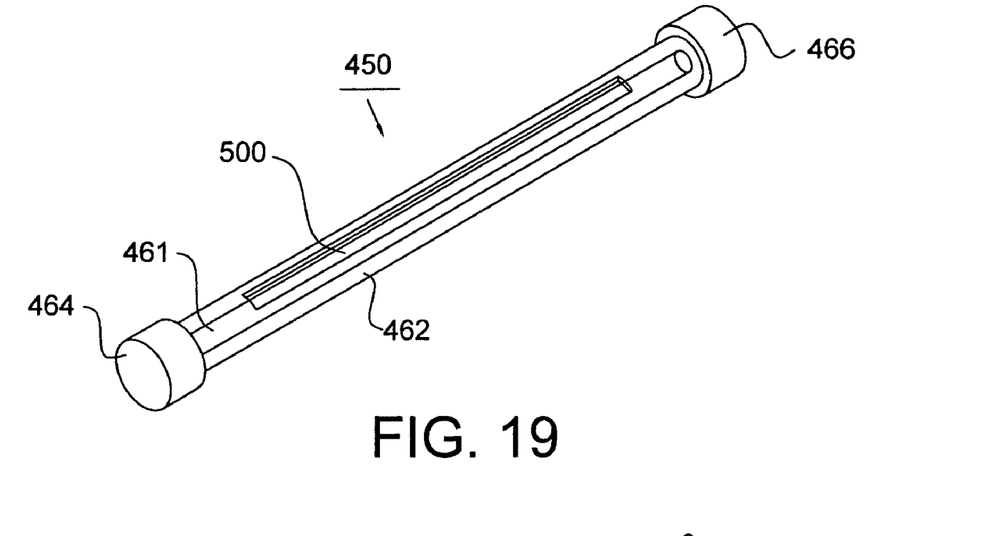
FIG. 19 is a perspective view of a lamp according to another embodiment of the present invention.

In the above embodiments, the light-permeable tube 462 preferably has an opening 500, as shown in FIG. 19, for increasing light transmittance and improving heat dissipation effect. Further, the opening 500 can be disposed at any position on the light-permeable tube 462 and therefore not limited to the embodiment of the present invention.

Figure 20:
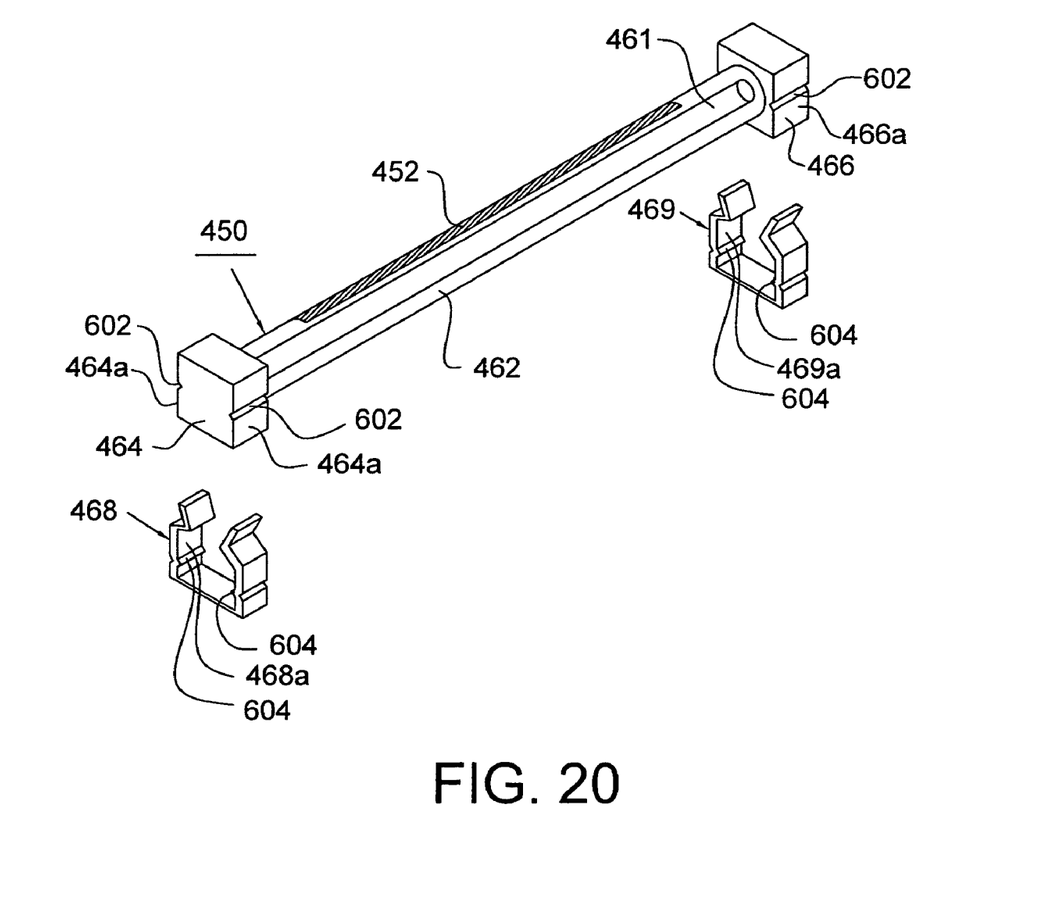
FIG. 20 is a schematic view of the configuration of a lamp according to another embodiment of the present invention.

It should be understood that the external conductive electrodes 464, 466 and lamp connection units 468, 469 in the above embodiments could also be designed to have some positioning mechanisms such that the foggy region 452, the reflecting film 498 or the opening 500 of the light-permeable tube 462 can be well positioned and effectively utilized. FIG. 20 is a schematic view of the configuration of the lamp 450 according to anther embodiment of the present invention. The external conductive electrodes 464 and 466 are designed as square, and each has two V-shaped notches 602 respectively formed on its two side walls 464a, 466a. In addition, the conductive clamp members 468a and 469a of the lamp connection units 468 and 469 respectively have two V-shaped protrusions 604 corresponding to the V-shaped notches 602 such that the external conductive electrodes 464 and 466 can be respectively and fixedly clamped within the lamp connection units 468 and 469.

In the above-mentioned embodiments, the light-permeable tube 462 is preferably made of transparent glass or any other light-permeable materials.

The aspect of the present invention is that a backlight unit comprises a housing for accommodating lamps and an upper frame for accommodating a plurality of optical films and a liquid crystal panel; wherein the upper frame and the housing can be secured to each other by the engagement structure of the clip members and the connection holes such that the plurality of optical films and the liquid crystal panel can be easily removed while the upper frame is disassembled from the housing, and further such that the assembling and disassembling works while replacing or repairing the lamps can be more easily accomplished. Further, the lamp of the backlight unit according to present invention has the foggy region thereby reducing the distance between the liquid crystal panel and the lamps and avoiding the uneven luminance problem at the same time. Also, each lamp is fixed within the cavity by the conductive clamp member of the lamp connection unit and electrically connected to a power such that the lamp can be replaced or repaired without a tedious soldering process.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A direct type backlight unit having a liftable frame structure, said backlight unit comprising:
    a housing defining a cavity and having at least two first connection elements;
    at least one lamp being disposed within the cavity and having a conductive electrode for being connected to an external power source;
    an upper frame defining a recess for accommodating at least one optical film and defining an opening at its bottom for receiving light provided by the lamp, and the upper frame having
        at least two second connection elements respectively connected with the first connection elements of the housing such that the upper frame is fixed on the housing, and
        at least two third connection elements; and
    an outer frame having at least two fourth connection elements respectively connected with the third connection elements of the upper frame such that the outer frame is fixed on the upper frame;
    wherein one of the third and fourth connection elements are connection holes and the other are clip members for engaging with the connection holes;
    wherein the first connection elements are formed integrally with the housing and the second connection elements are formed integrally with the upper frame; and
    wherein the lamp includes a glass tube, and has a foggy region formed thereon by a film attached to an outer surface of the glass tube.

2. The direct type backlight unit as claimed in claim 1, wherein one of the first and second connection elements are connection holes and the other are clip members for engaging with the connection holes.

3. The direct type backlight unit as claimed in claim 1, further comprising a lamp connection unit disposed within the cavity wherein the lamp connection unit has a conductive clamp member which clamps the conductive electrode for fixing the lamp within the cavity of the housing.

4. The direct type backlight unit as claimed in claim 3, wherein the conductive clamp member is adapted to be electrically connected to the external power source.

5. The direct type backlight unit as claimed in claim 1, wherein the housing and the upper frame further comprise at least one positioning hole and at least one positioning element corresponding to the positioning hole in position wherein the positioning hole is connected with the positioning element such that the upper frame is positioned on the housing.

6. A liquid crystal display device, comprising:
    a liquid crystal panel having a display area;
    a direct type backlight unit disposed below the liquid crystal panel, the direct type backlight unit comprising:
        a housing defining a cavity;
        at least one lamp being disposed within the cavity and having a conductive electrode for being connected to a power source; and
        an upper frame defining a recess which accommodates the liquid crystal panel and defines an first opening at its bottom for receiving light provided by the lamp, and the upper frame having at least two first connection elements; and an outer frame disposed upon the upper frame such that the liquid crystal panel is fixed within the recess of the upper frame, and the outer frame defining a second opening such that the display area of the liquid crystal panel is exposed from the second opening, wherein the outer frame has at least two second connection elements respectively connected with the first connection elements of the upper frame such that the outer frame is fixed on the upper frame, wherein one of the first and second connection elements are connection holes and the other are clip members for engaging with the connection holes, and wherein the first connection elements are formed integrally with the upper frame and the second connection elements are formed integrally with the outer frame.

7. The liquid crystal display device as claimed in claim 6, further comprising third connection elements formed integrally with the housing and fourth connection elements formed integrally with the upper frame wherein the upper frame is fixed on the housing by connections of the third connection elements with the fourth connection elements.

8. The liquid crystal display device as claimed in claim 6, wherein the housing and the upper frame further comprise at least one positioning hole and at least one positioning element corresponding to the positioning hole in position wherein the positioning hole is connected with the positioning element such that the upper frame is positioned on the housing.

9. The liquid crystal display device as claimed in claim 6, further comprising a lamp connection unit disposed within the cavity, wherein the lamp connection unit has a conductive clamp member which clamps the conductive electrode for fixing the lamp within the cavity of the housing.

10. The backlight unit as claimed in claim 1, wherein the material of the film is selected from the group consisting of polycarbonate resin and poly-ethylene terephthalate resin.

11. The backlight unit as claimed in claim 1, wherein the film further includes a scattering material with high optical transparency.

12. The backlight unit as claimed in claim 11, wherein the scattering material with high optical transparency is fine glass power.

* * * * *